US008645765B2

(12) United States Patent
Masser et al.

(10) Patent No.: US 8,645,765 B2
(45) Date of Patent: Feb. 4, 2014

(54) SERIALIZED ERROR INJECTION INTO A FUNCTION UNDER TEST

(75) Inventors: Joel Leslie Masser, San Jose, CA (US); Eileen Patricia Tedesco, Sharon, CT (US)

(73) Assignee: International Business Machines Corporation, Armonk, NY (US)

( * ) Notice: Subject to any disclaimer, the term of this patent is extended or adjusted under 35 U.S.C. 154(b) by 299 days.

(21) Appl. No.: 13/253,761

(22) Filed: Oct. 5, 2011

(65) Prior Publication Data

US 2013/0091383 A1      Apr. 11, 2013

(51) Int. Cl.
*G06F 11/00*      (2006.01)
(52) U.S. Cl.
USPC ............................................. 714/41; 717/126
(58) Field of Classification Search
None
See application file for complete search history.

(56) References Cited

U.S. PATENT DOCUMENTS

| 6,477,666 | B1* | 11/2002 | Sanchez et al. | 714/41 |
| 7,114,164 | B2* | 9/2006 | Smith et al. | 719/318 |
| 7,404,107 | B2 | 7/2008 | Burk | |
| 7,536,605 | B2 | 5/2009 | Keaffaber | |
| 7,757,215 | B1 | 7/2010 | Zhou | |
| 7,827,438 | B2 | 11/2010 | Tarta | |
| 2004/0243882 | A1* | 12/2004 | Zhou | 714/38 |
| 2006/0271825 | A1* | 11/2006 | Keaffaber et al. | 714/38 |

* cited by examiner

*Primary Examiner* — Scott Baderman
*Assistant Examiner* — Jason Bryan
(74) *Attorney, Agent, or Firm* — Eric A. Gifford

(57) ABSTRACT

Method embodiments for triggering error injection into a function under test using a serialization resource are provided. A test process invokes the function under test immediately after relinquishing exclusive control of the serialization resource. An error-injection process injects the error into the running function after gaining exclusive control of the serialization resource from the test process. The error-injection process may add a delay to inject the error. If the processes are repeated, the error-injection process may vary the delay, perhaps randomly, over a specified time window to thoroughly exercise the function's error recovery routine.

11 Claims, 4 Drawing Sheets

SERIALIZED ERROR INJECTION INTO A FUNCTION UNDER TEST

BACKGROUND

1. Field of the Invention

The present invention relates to the testing of software functions and their error recovery routines, and more specifically, to a method of controlling the timing of error injection into a function under test.

2. Description of the Related Art

Software testing, which documents that a piece of software is operating correctly, is an important component of software development, and is often the most costly part of the process. After the developer is satisfied that the finished software product will operate satisfactorily under normal operating conditions, the software is turned over to testers who will run a set of tests to examine the performance of the software when unforeseen errors (also referred to as "faults") are intentionally injected into the operational system.

Software error injection is a method that may be used to test the resiliency of a system's software to a variety of errors. It is frequently used to identify a system's software error vulnerabilities, in order to improve the software to remove flaws prior to delivery to the customer. Alternately, the customer may use software error injection to test customer-defined applications for their own use or subsequent release to another customer.

The software to be tested may be a "function" that can be called by a customer at the application level. The "function" is a unit of processing (software or firmware) that includes a recovery routine to handle unforeseen errors. A "function" may be an elementary function such as Open, Close, Read, Write, allocate or deallocate a file, acquire or free storage, create or delete a subtask or display a screen image of an Operating System (OS). Alternately, a "function" may be a customer-defined application that runs on the OS.

One common error injection practice is to insert "hooks" at fixed locations of logic in the source code of a particular function under test. When enabled, the hooks inject an error at the fixed location into the running source code that invokes the function's error recovery routine. This practice requires modification of the source code and provides no timing diversity to the invocation of the error recovery routine. The hooks are disabled prior to sending the source code to the customer.

Another common error injection practice is to externally inject the errors at totally random times into the running source code. This practice does not require modification of the source code but is inefficient. The particular function under test may occupy a relatively small time window of the entire process. Random error injection is quite likely to miss the function under test and invoke an error recovery process of no interest.

BRIEF SUMMARY

In view of the foregoing, various method embodiments for controlling the timing of error injection into a function under test having an error recovery routine to handle unforeseen errors via serialization are provided.

According to one embodiment of the present invention, a test process that invokes the function under test is synchronized to an error injection process that injects an error into the running function via a serialization resource. The test process, which exercises exclusive control over the serialization resource, relinquishes control over the serialization resource and immediately invokes the function under test. The error injection process, which is running concurrently with the test process, attempts to gain control over the serialization resource, and once successful injects the error into the running function. The error injection process may add a delay, typically within a time window specified by minimum and maximum values for a particular error and/or function under test. The error injection process may randomly select the delay from the time window.

According to the one embodiment of the present invention, after injecting the error the error injection process may immediately relinquish exclusive control over the serialization resource. The test process may then regain exclusive control of the serialization resource and invoke the function under test to repeat the process. The error injection process may vary the delay with each repetition of the process, perhaps randomly within the time window.

According to the one embodiment of the present invention, the test process may perform pre-invocation processing to acquire resources needed to invoke the function under test prior to relinquishing exclusive control of the serialization resource and may perform post-invocation processing to release the acquired resources after regaining exclusive control of the serialization resource.

According to another embodiment of the present invention, a method of error injection into a function under test comprises synchronizing concurrently running test and error-injection processes through a serialization resource. The test process executes the steps of building a name for the serialization resource, allocating the named serialization resource for exclusive use by the test process, performing pre-invocation processing to acquire resources needed to invoke the function under test, deallocating the named serialization resource to relinquish exclusive control of the named serialization resource, immediately following relinquishing control of the named serialization resource, invoking the function under test, reallocating the named serialization resource for exclusive use, and performing post-invocation processing to release the acquired resources. The error-injection process concurrently executes the steps of building the same name for the serialization resource, attempting to allocate the named serialization resource for exclusive use by the error-injection process until the test process relinquishes control of the named serialization resource, after gaining control of the named serialization resource, injecting an error into the running function under test, and deallocating the named serialization resource to relinquish exclusive control of the named serialization resource. The error-injection process may add a delay to the injection of the error. The delay may be varied, perhaps randomly, over a time window with each repetition of the process.

Related system and computer program product embodiments are also disclosed and provide additional advantages.

BRIEF DESCRIPTION OF THE SEVERAL VIEWS OF THE DRAWINGS

In order that the advantages of the invention will be readily understood, a more particular description of the invention briefly described above will be rendered by reference to specific embodiments that are illustrated in the appended drawings. Understanding that these drawings depict only embodiments of the invention and are not therefore to be considered to be limiting of its scope, the invention will be described and explained with additional specificity and detail through the use of the accompanying drawings, in which.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

In view of the foregoing, various method embodiments for controlling the timing of error injection into a function under test having an error recovery routine to handle unforeseen errors are provided. Serialization is used to synchronize a test process that invokes a function under test and an error-injection process that injects an error into the invoked function. The test process, which normally exercises exclusive control over the serialization resource, relinquishes control over a serialization resource and immediately invokes the function under test. The error injection process, which is running concurrently with the test process, attempts to gain control over the serialization resource, and once successful injects the error into the running function. The error injection process may add a delay, perhaps randomly, with each repetition of the process to more fully exercise the function's error recovery routine.

Figure 1:
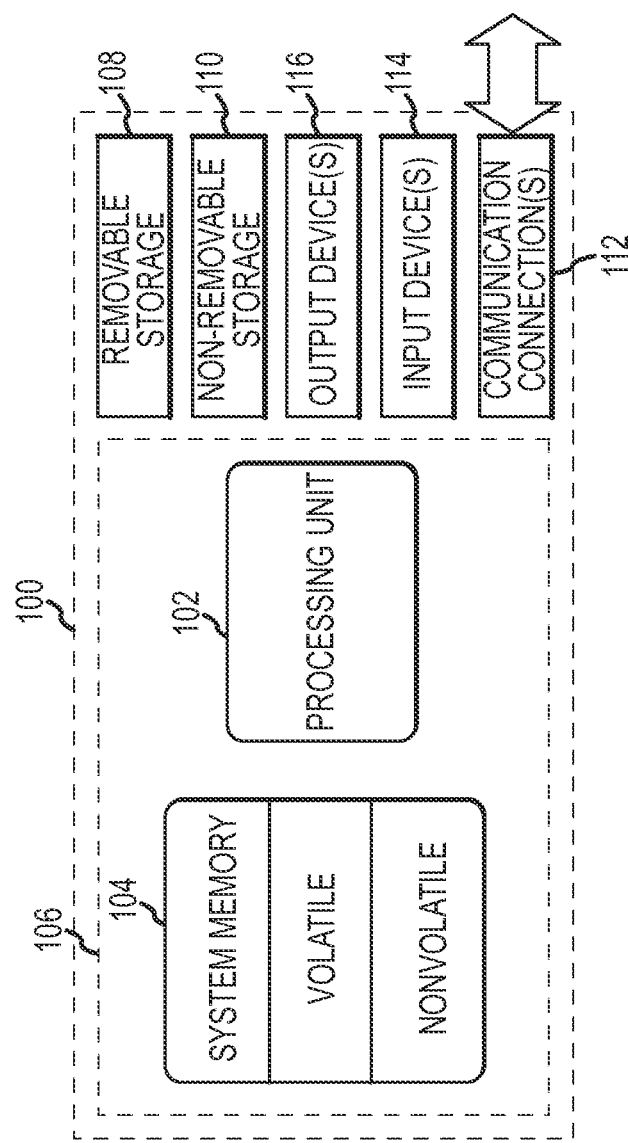
FIG. 1 shows an embodiment of general-purpose computing environment in accordance with aspects of the present invention.

With reference to FIG. 1, an exemplary system for implementing the invention within a general purpose computing environment includes a computing device, such as computing device 100. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. This most basic configuration is illustrated in FIG. 1 by dashed line 106.

Device 100 may also have additional features/functionality. For example, device 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 100. Any such computer storage media may be part of device 100.

Device 100 may also contain communications connection(s) 112 that allow the device to communicate with other devices. Communications connection(s) 112 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Device 100 may also have input device(s) 114 such as keyboard, mouse, pen, voice input device, touch input device, etc. Output device(s) 116 such as a display, speakers, printer, etc. may also be included. All these devices are well know in the art and need not be discussed at length here.

Prior to public release of software (e.g. an Operating System or an Application built upon an Operating System), the software undergoes extensive testing. Because of the complexities of code, automated testing systems are used to accurately perform tests. These automated tests provide repeatability to provide testers the ability to determine if software modifications actually work. Aspects of the present invention permit a user to identify a function and an error and instruct a testing system to inject that error into that function under test.

Automated tests and good code coverage results require that conditions be repeatable and that error recovery routines be thoroughly exercised. Stress failures and system lockups can come from untested error recovery routines. Rather than existing practices which either modify the source code to set hooks at fixed logic locations in the function to invoke the target function's error recovery routine or randomly inject errors into the processing hoping that the error invokes the target function's error recovery routine, aspects of the present invention allow developers to more precisely (and with greater probability) inject errors into the running function under test within the larger test process to more easily reproduce a problem and consistently verify the error recovery routine for increased reliability. Aspects of the present invention provide a method for varying, perhaps randomly, the timing of the injection of the error within the time window in which the function under test is running to more robustly exercise the error recovery routine.

Figure 2:
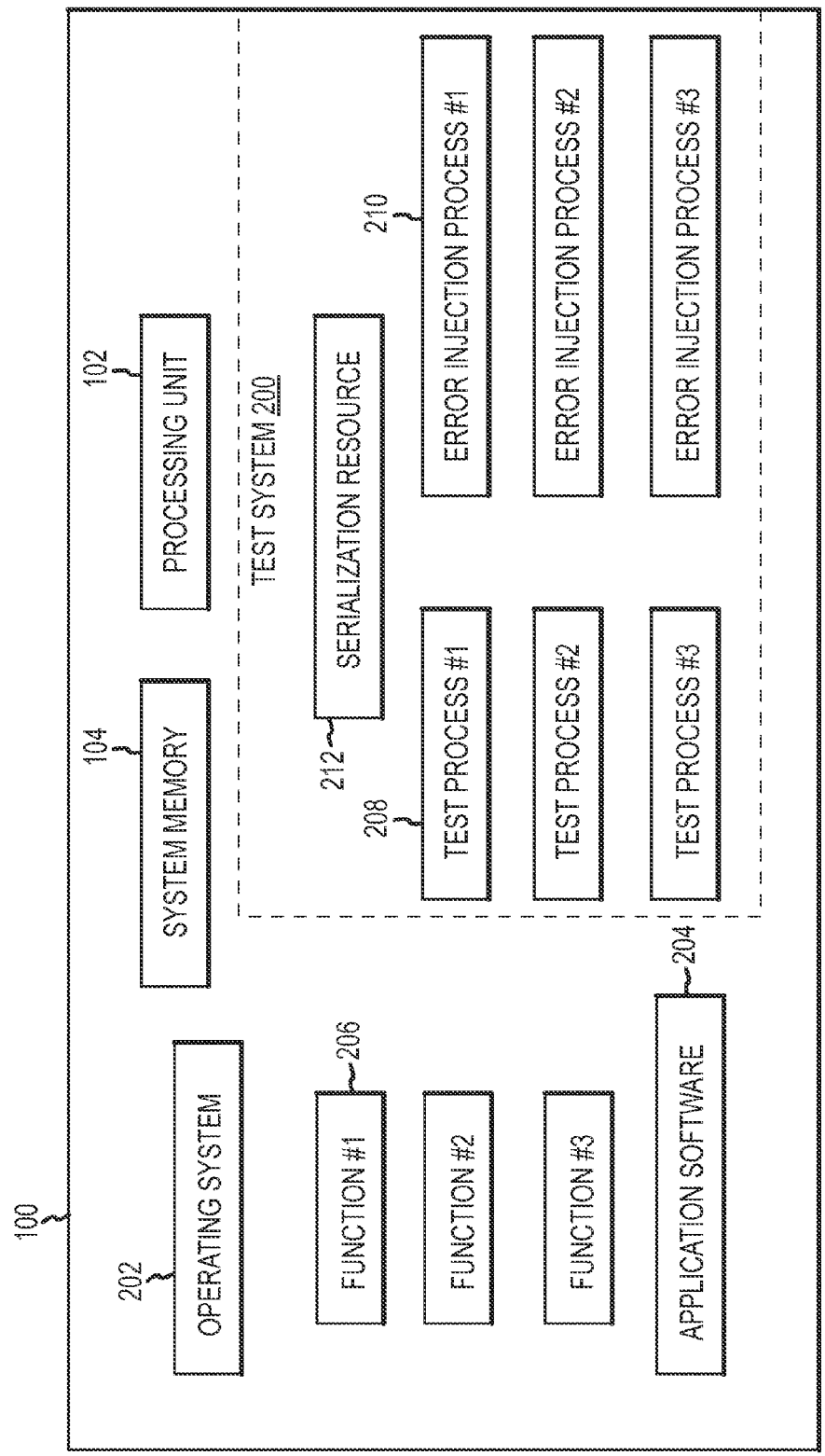
FIG. 2 shows an embodiment of a test system for error injection into a function under test using a serialization resource implemented in the general-purpose computing environment.

With reference now to FIG. 2, an exemplary embodiment of a test system 200 for controlling the timing of error injection into a function under test is implemented within the general purpose computing environment, and more particularly within processing unit 102 and system memory 104 of computing device 100.

An Operating System (OS) 202 is software, consisting of programs and data, that runs on computing device 100, manages computer hardware resources, and provides common services for execution of various application software 204. The operating system is the most important type of system software in a computer system. Without an operating system, a user cannot run an application program on their computer, unless the application program is self-booting. For hardware functions such as input and output and memory allocation, the operating system acts as an intermediary between application programs and the computer hardware, although the application code is usually executed directly by the hardware and will frequently call the OS or be interrupted by it. Operating systems are found on almost any device that contains a computer—from cellular phones and video game consoles to supercomputers and web servers. The IBM z/OS is an example of an OS for mainframe computers.

The software to be tested may be considered to be a "function" 206. The "function" is a unit of processing (software or firmware) that includes an error recovery routine to handle unforeseen errors. A "function" may be an elementary function of the OS such as Open, Close, Read, Write, allocate or deallocate a file, acquire or free storage, create or delete a subtask or display a screen image. Alternately a "function" may be an application such as application 204 that runs on the OS.

Test system 200 includes one or more test processes 208 configured to invoke one or more different functions 206 and one or more error injection processes 210 configured to inject one or more different errors. Test system 200 uses serialization of a serialization resource 212 to synchronize the concurrently running test process 208 and error injection process 210 and trigger the injection of the error into the running function under test 206. Serialization resource 212, for example, may be a dataset or file, and disks or tape drives or virtual resources, such as lists, queues, and control blocks or any other resource available to the test process that can be serialized. Serialization resource 212 may be a resource that is used by the function or may be a dummy resource used for purposes of triggering error injection only.

For example, Global Resource Serialization (GRS) is the component within the IBM z/OS operating system responsible for enabling fair access to serially reusable computing resources, such as datasets and tape drives or virtual resources, such as lists, queues, and control blocks. Programs can request exclusive access to a resource (which means that program and all subsequent requesting programs are blocked until that program is given access to the resource), usually requested when a program needs to update the resource or shared access (which means that multiple programs can be given access to the resource), usually requested when a program only needs to query the state of the resource. GRS manages all requests in FIFO (first in/first out) order. Other operating systems with have similar components that enable access to serially reusable computing resources.

In an embodiment within the IBM z/OS operating system, test program 200 may invoke GRS to enable exclusive serial access to serialization resource 212 to synchronize test process 208 and error injection process 210 to trigger the injection of the error into the running function under test 206.

The test process 208, which normally exercises exclusive control over the serialization resource 212, relinquishes control over the serialization resource and immediately invokes the function under test 206. The error injection process 210, which is running concurrently with the test process 208, attempts to gain control over the serialization resource 212, and once successful injects the error into the running function. The error injection process may add a delay, typically within a time window specified by minimum and maximum values for a particular error and/or function under test. The time window may, for example, approximately span the run time of the function under test. The error injection process may randomly select the delay from the time window.

According to the one embodiment of the present invention, after injecting the error the error injection process 210 may immediately relinquish exclusive control over the serialization resource 212. The test process 208 may then regain exclusive control of the serialization resource. The test system may then repeat the entire process. The error injection process may vary the delay with each repetition of the process, perhaps randomly within the time window.

According to the one embodiment of the present invention, the test process 208 may perform pre-invocation processing to acquire resources needed to invoke the function under test 206 prior to relinquishing exclusive control of the serialization resource 212 and may perform post-invocation processing to release the acquired resources after regaining exclusive control of the serialization resource 212 from the error injection process 210.

Serialization increases the probability that the error will be injected into the running function under test and not into pre- or post-invocation processing within the test process. The run time of the function under test may be a small fraction of the total run time of the test process. The addition of a delay may allow for more precise or thorough testing of the function's error recovery routine. The entire process may be repeated with the same delay to test for error propagation within the function and its error recovery routine or with a different (e.g. random) delay to test for timing related problems in the error recovery routine. Furthermore, The test system injects errors into the running function under test without any modifications to the source code of the function.

Figure 3:
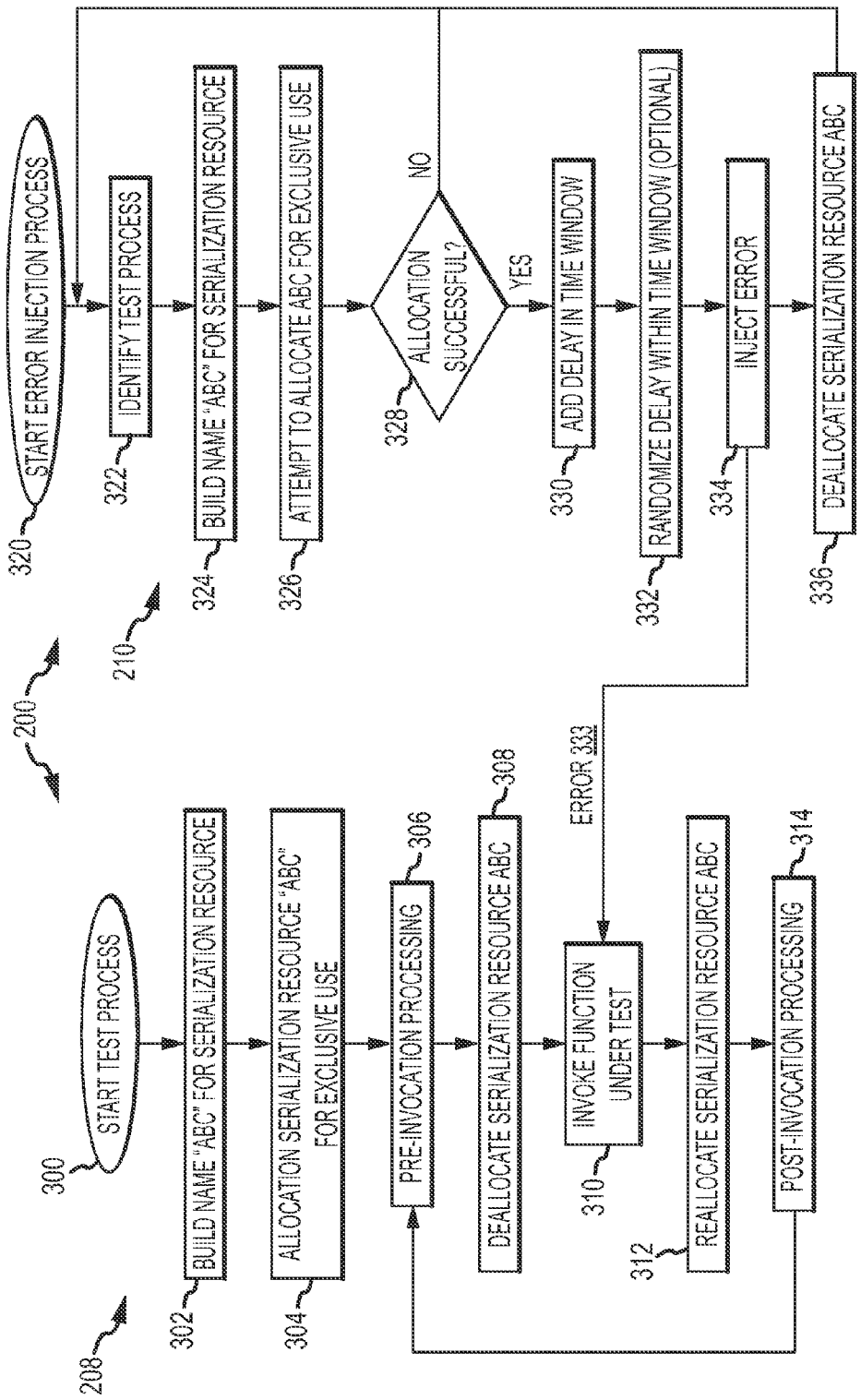
FIG. 3 shows an embodiment of a flow diagram of the test system for error injection in which the serialization resource is used to synchronize a test process that invokes the function under test and an error injection process that injects an error into the running function under test.

With reference now to FIG. 3, an exemplary embodiment of a method of implementing test system 200 enables serial access to a serialization resource in order to synchronize concurrently running test process 208 and error injection process 210 and trigger the injection of an error into a running function under test.

Test process 208 is started (step 300) and builds a name (e.g. "ABC") (step 302) for a designated serialization resource (e.g. a data set). Test process 208 allocates the named serialization resource "ABC" for exclusive use (step 304). For example, in the IBM z/OS operating system, test process 208 may invoke the Global Resource Serialization component to provide exclusive access to the serialization resource to the test process. Test process 208 performs pre-invocation processing to acquire resources needed to invoke the function under test (step 306). Pre-invocation processing may include creating or acquiring any necessary resources and establishing any environmental conditions required by the function under test. Test process 208 deallocates names serialization resource ABC thereby relinquishing exclusive control over the resource (step 308) and immediately invokes the function under test (310). Once the function under test (and its error recovery routine) has finished running (and the error injection process has relinquished control over the serialization resource), the test process reallocates the named serialization resource ABC to regain exclusive control of the resource (step 312). The test process performs post-invocation processing to release the acquired resources (step 314). Post-invocation processing may include cleaning up or releasing any acquired resources and possible return the process to the initial state it was in before the pre-invocation processing. The entire process may be repeated by return to pre-invocation processing step 306.

Error injection process 210 is started (step 320) and runs concurrently with test process 208. The associated test process is identified (step 322) to determine the function under test and where to inject the error. The error injection process builds the same name (e.g. "ABC") (step 324) for the designated serialization resource. The error injection process enters a loop to attempt to allocate named serialization resource ABC for its exclusive use (step 326). If unsuccessful (step 328), the process continues to attempt to allocate the resource in step 326 at a specified retry interval for obtaining the serialization resource. Once the test process relinquishes control of the serialization resource (step 308), the error injection process' attempt to allocate the serialization resource ABC for its exclusive use and gain control of the resource (step 326) should be successful (step 328) within the specified retry interval. The error injection process suitably adds a delay within a time window bounded by minimum and maximum delays before error injection (step 330). The time window may, for example, bound the expected run time of the function under test or bound a narrower window for more precisely injecting the error. The error injection process may randomize the delay within the time window for either a single test or with each repetition of the test (step 332). After the specified delay, the error injection process injects the error 333 into the running test process and specifically the running function under test (step 334). The error injection process deallocates serialization resource ABC (step 336) thereby relinquishing control of the resource and allowing the test process to regain exclusive control of named serialization resource ABC in step 312.

Figure 4:
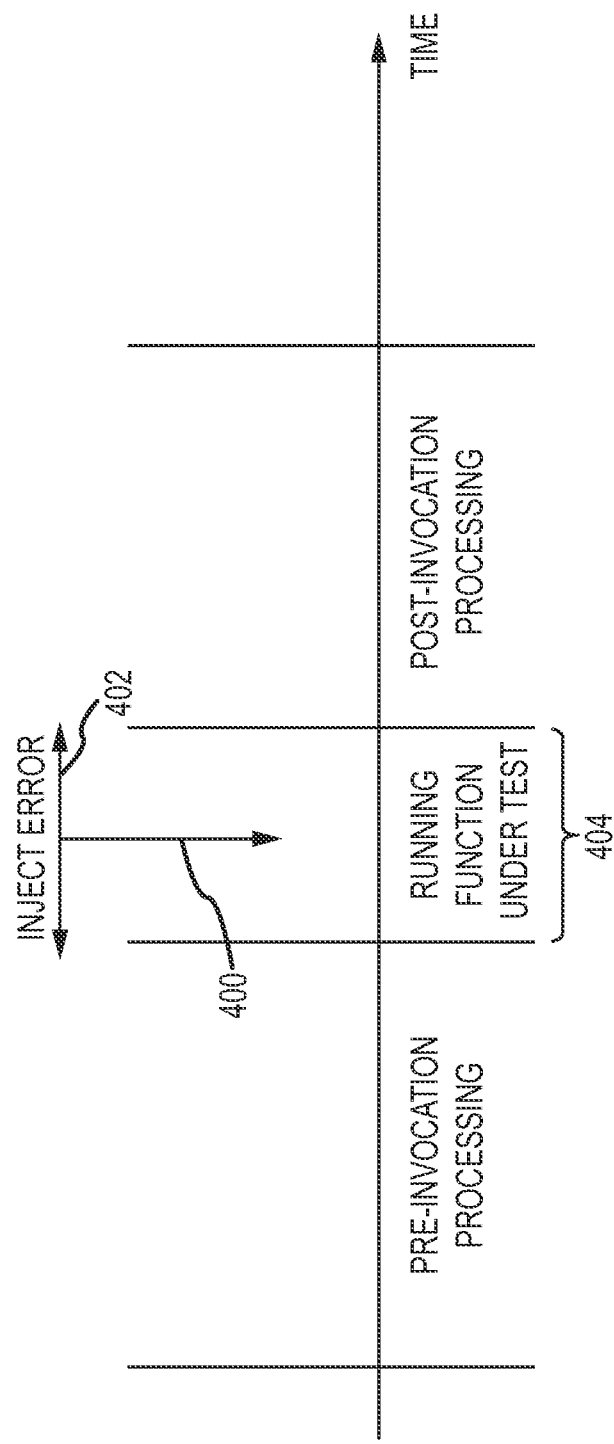
FIG. 4 shows an embodiment a timing diagram in which the error injection process injects the error into the running function under test, and randomly varies an injection delay over multiple invocations of the function.

As shown in FIG. 4, a large portion of the time for running the test process is spent performing pre-invocation and post-invocation processing to support running the function under test. The serialized test system injects the error 400 with high probability into the running function under test and with precision relative to the timing of the running function. The serialized test system may also delay 402 the error injection by varying amounts, perhaps randomly, within a specified time window 404.

Triggering the error injection based on serial access to the serialized resource improves the efficiency of the overall test procedure. For example, for a given function under test the total run time may be approximately 40% pre-invocation processing, 20% function processing and 40% post-invocation processing. Whereas the practice of total random error injection may only hit the invoked function 20% of the time, the serialized process should hit the invoked function closer to 100% of the time. Misses are still possible if, for example, invocation of the function under test is delayed for some reason, but are much less likely.

Triggering the error injected based on serial access with an optional added delay allows for more precise timing of the invocation of the function's error recover routine. The ability to vary the added delay, perhaps randomly, over a specified time window for repeated tests provides for a more thorough testing of the function's error recovery routine. Whereas the practice of modifying the source code to provide hooks will only invoke the error recovery routine at a fixed logical location, the serialized process with variable delay will invoke the error recovery routine at multiple different logical locations. Furthermore, this additional performance is achieved without any modifications to the function's source code.

Consider testing of a "Write" function of the IBM z/OS operating system in which the serialization resource is a data set and the error injected is to "remove volume". The error process builds a name "ABC" for the data set and exclusive allocates data set ABC for the test process. In pre-invocation process, the test process than obtains a volume and creates another data set XYZ. The test process relinquishes control over data set ABC as the serialization re source invokes the "Write" function to write to data set XYZ. The error injection process gains control over data set ABC and triggers injection of the error, which may be delayed by 1-5 seconds. The error injection process removes the volume. With the volume removed, the "Write" to data set XYZ will fail since the volume cannot be accessed. The function's error recovery routine will be invoked to handle the error condition. Once the test process regains control over data set ABC, the process performs the post-invocation process to restore the volume and delete data set XYZ.

Another example is the use of the serialized test system to test a "Catalog" function in the z/OS operating. A workload that issues Catalog requests is used for stress testing the Catalog. The workload consists of jobs that in addition to exercising Catalog spends a large proportion of time doing administrative processing, such as loop control, constructing the parameter set, and making decisions about the manner of testing (e.g. pre and post-invocation testing). The error injection consists of a job that randomly cancels a test job. Using existing practices, it was rare that Catalog recovery was actually invoked. Instead, typically TSO or REXX was in control and it was their recovery that was tested. The serialized test system of the present invention is implemented by adding code to the workload jobs to allocate a data set to be used for serialization. Immediately preceding a Catalog request, the data set was freed and immediately following completion of the request the data set was re-allocated. Logic was added to the error injection job to attempt allocation of the serialization data set and cancel the test job if and only if the allocation was successful. In this way, every error injection tested Catalog recovery.

As will be appreciated by one of ordinary skill in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "Comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable other of ordinary skill in the art to understand the invention for various embodiments with various modifications as are suited to the particular use contemplated.

What is claimed is:

1. A method of error injection into a function under test that has an error recovery routine to handle unforeseen errors, said method comprising the steps of synchronizing a test process that invokes the function under test with an error-injection process that injects an error into the running function under test through a serialization resource, said test process invoking the function under test immediately after relinquishing exclusive control of the serialization resource, said error-injection process injecting the error after gaining exclusive control of the serialization resource from the test process.

2. The method of claim 1, wherein the error-injection process adds a random delay to inject the error into the function under test.

3. The method of claim 1, wherein said error-injection process relinquishes exclusive control over the serialization resource immediately after injecting the error into the function under test, said test process regaining exclusive control of the serialization resource.

4. The method of claim 3, wherein the steps of synchronizing the test process that invokes the function under test with the error-injection process that injects the error into the running function under test through the serialization resource are repeated one or more times.

5. The method of claim 4, wherein the error-injection process adds a delay to the injection of the error into the function under test, said error-injection process varying the delay with each said repetition.

6. The method of claim 5, wherein the error-injection process varies the delay randomly over a specified time window.

7. The method of claim 1, wherein the test process performs pre-invocation processing to acquire resources needed to invoke the function under test prior to relinquishing, exclusive control of the serialization resource and performs post-invocation processing to release the acquired resources after regaining exclusive control of the serialization resource.

8. A method of error injection into a function under test that has an error recovery routine to handle unforeseen errors, said method comprising the steps of:

synchronizing concurrently running test and error-injection processes through a serialization resource, said test process comprising the steps of:

building a name for the serialization resource, allocating the named serialization resource for exclusive use by the test process, performing pre-invocation processing to acquire resources needed to invoke the function under test;

deallocating the named serialization resource to relinquish exclusive control of the named serialization resource, immediately following relinquishing control named serialization resource, invoking the function under test, reallocating the named serialization resource for exclusive use, and performing post-invocation processing to release the acquired resources, and said error-injection process comprising the steps of:

building the same name for the serialization resource, attempting to allocate the named serialization resource for exclusive use by the error-injection process until the test process relinquishes control of the named serialization resource, after gaining control of the named serialization resource, injecting an error into the running function under test, and deallocating the named serialization resource to relinquish exclusive control of the named serialization resource.

9. The method of claim 8, wherein the steps of synchronizing the concurrently running test and error-injection processes through the serialization resource are repeated one or more times.

10. The method of claim 9, wherein the error-injection process adds a delay to the injection of the error into the function under test, said error-injection process varying the delay with each said repetition.

11. The method of claim 10, wherein the error-injection process varies the delay randomly over a specified time window.

* * * * *